E. E. ALVAREZ.
APPARATUS FOR WATERING BY MEANS OF SUSPENDED PIPES.
APPLICATION FILED AUG. 10, 1917.

1,321,350.

Patented Nov. 11, 1919.

UNITED STATES PATENT OFFICE.

ERNEST EUGÈNE ALVAREZ, OF TUNIS, TUNIS.

APPARATUS FOR WATERING BY MEANS OF SUSPENDED PIPES.

1,321,350.  Specification of Letters Patent.  Patented Nov. 11, 1919.

Application filed August 10, 1917. Serial No. 185,611.

*To all whom it may concern:*

Be it known that I, ERNEST EUGÈNE ALVAREZ, residing at Tunis, Tunis, have invented new and useful Apparatus for Watering by Means of Suspended Pipes, of which the following is a specification.

This invention relates to an apparatus for watering by means of suspended perforated pipes, intended for irrigating large cultivated areas.

Figure 1:
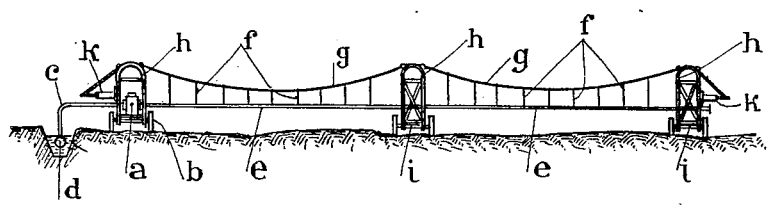

In the accompanying drawing given merely by way of example, Figure 1 shows diagrammatically in elevation the general arrangement of the apparatus.

Figure 2:
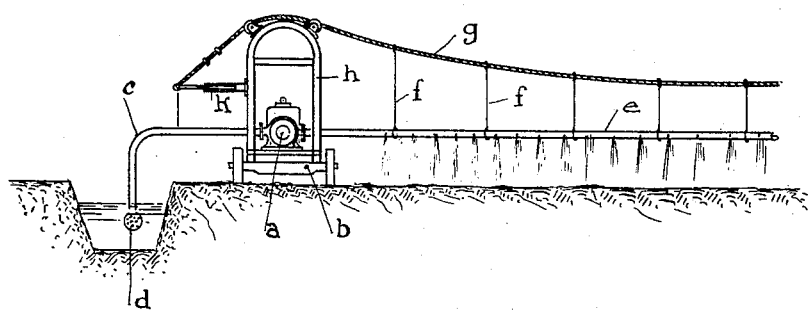

Fig. 2 represents part of the apparatus with the elements on an enlarged scale.

The said apparatus comprises a suction and delivery pump $a$ driven say by means of an explosion engine. The set comprising the engine and pump, is mounted on a truck $b$ which can travel freely. The suction pipe $c$ of the pump projects with its free end into a canal or ditch $d$ containing the water required for irrigation.

The delivery pipe $e$ is arranged horizontally or parallel to the surface of the ground to be watered, and suspended by cords $f$ to a cable $g$ passing over brackets $h$ arranged: one on the truck $a$, and the others on similar other trucks $i$ at suitable intervals apart, the number of the said trucks depending of course on the size of the ground to be watered. The brackets $h$ are provided with small grooved pulleys over which passes the cable $g$, owing to which the trucks can be moved laterally if required. Each end of the cable $g$ is secured to a horizontal arm $k$ carried by the first truck $b$ and the last truck $i$. One of the arms $k$, or both, are made telescopic or expanding at will, so that the tension of the cable $g$ can be regulated in accordance with the movements of the various trucks.

The delivery pipe $e$ may be flexible throughout the whole of its length, or constituted by flexible and rigid parts; it is provided with holes or with devices such as roses, enabling water to be distributed in a given quantity per meter run.

In the event of the apparatus being caused to describe a circle about the pump, which would be the case when the latter draws water from a well or basin, the deliveries by the various sections of the pipe $e$ must be in proportion to the areas watered.

The use of the apparatus has important advantages: It does not require any work of leveling or of cutting ditches as in the case of irrigation by submersion or by infiltration; the distribution of water is effected in a uniform and quick manner and economically; in fact, with this kind of watering by showers, it is possible to rely on almost exact distribution of the quantity of water considered necessary for the plants; it is possible to water a maximum of area with a given quantity of water, and to increase therefore profits from the cultivation. Moreover, it results in an economy of labor for a given area watered, the work of the attendant being very simple, not onerous and limited to the moving and supervising of the apparatus.

Having now particularly described the nature of my said invention and in what manner the same is to be performed, I declare that what I claim is:

In a watering apparatus of the character described, the combination with a source of water, a flexible pipe line of any desired length provided with holes or perforations, a plurality of trucks adapted to travel over uneven surfaces, a horizontally disposed main cable, and cables hanging from the main cable for suspending said pipe line, brackets and pulleys on each truck over which the main cable is passed, a motor operated suction and force pump on one of said trucks communicating with said flexible pipe, a suction pipe connecting said pump and said source of water, and extensible horizontal arms at each end of the main cable allowing a regulation of the tension of the same, substantially as described.

In testimony whereof I affix my signature in presence of two witnesses.

ERNEST EUGÈNE ALVAREZ.

Witnesses:
ROBERT FRASEE,
ALBERT TAIEBE.

Copies of this patent may be obtained for five cents each, by addressing the "Commissioner of Patents, Washington, D. C."